United States Patent
Bae et al.

(10) Patent No.: US 6,767,960 B2
(45) Date of Patent: Jul. 27, 2004

(54) PROCESS FOR PREPARING HIGH IMPACT VINYL AROMATIC POLYMER BY CONTINUOUS ANION POLYMERIZATION METHOD

(75) Inventors: Jong-Hyun Bae, Daejeon (KR); Jong-Hyun Park, Daejeon (KR); Jong-Geun Kim, Daejeon (KR); Dai-Seung Choi, Daejeon (KR); Sam-Min Kim, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 10/320,692

(22) Filed: Dec. 17, 2002

(65) Prior Publication Data

US 2004/0024117 A1 Feb. 5, 2004

(30) Foreign Application Priority Data

Aug. 3, 2002 (KR) .................................... 2002-45949

(51) Int. Cl.[7] ........................ C08F 297/04; C08L 53/02
(52) U.S. Cl. ...................... 525/53; 525/98; 525/271; 525/314; 525/340; 525/355; 525/356; 525/357; 525/374; 525/385; 525/386; 526/65; 526/82; 526/84
(58) Field of Search ..................... 525/53, 98, 271, 525/314, 340, 355, 356, 357, 374, 385, 386; 526/82, 84, 65

(56) References Cited

U.S. PATENT DOCUMENTS

| | | | |
|---|---|---|---|
| 4,335,221 A | 6/1982 | Gerberding | 525/89 |
| 4,584,346 A | 4/1986 | Kitchen | 525/98 |
| 4,839,418 A | 6/1989 | Schwaben et al. | 525/53 |
| 5,349,013 A | 9/1994 | Ashida et al. | 525/53 |
| 5,587,423 A | * 12/1996 | Brandstetter et al. | 525/52 |
| 5,705,569 A | 1/1998 | Moczygemba et al. | 525/314 |
| 5,795,938 A | 8/1998 | Knoll et al. | 525/98 |
| 5,955,537 A | * 9/1999 | Steininger Clites et al. | 525/53 |
| 6,096,828 A | 8/2000 | DePorter et al. | 525/98 |

FOREIGN PATENT DOCUMENTS

GB 1490625 11/1977

OTHER PUBLICATIONS

Patent Abstracts of Japan, 60–181112, Sep. 14, 1985.
Patent Abstracts of Japan, 63–048317, Mar. 1, 1988.
Patent Abstracts of Japan, 01–261444, Oct. 18, 1989.
Patent Abstracts of Japan, 02–132112, May 21, 1990.
Patent Abstracts of Japan, 04–088006, Mar. 19, 1992.

* cited by examiner

*Primary Examiner*—Fred Teskin
(74) *Attorney, Agent, or Firm*—Jacobson Holman PLLC

(57) ABSTRACT

The present invention is to provide a continuous anion polymerization method for preparing transparent high impact vinyl aromatic polymer comprising the steps of: i) charging and polymerizing vinyl aromatic monomers and initiator to obtain vinyl aromatic polymer in the presence of solvent and polar organic compounds in the first reactor (1a); ii) continuously charging and polymerizing vinyl aromatic monomers and conjugated diene monomers to the vinyl aromatic polymer obtained in the first reactor to obtain tapered vinyl aromatic polymer chain in the presence of organic solvent in the second reactor (1b); iii) continuously charging and polymerizing vinyl aromatic monomers and multi-functional compounds to the vinyl aromatic polymer chain obtained in the second reactor to obtain high impact vinyl aromatic polymer in the presence of organic solvent in the third reactor (1c); and iv) terminating the reaction with terminator and removing the remaining hydrocarbon solvent and unreacted monomers to obtain transparent high impact vinyl aromatic polymer having number average molecular weight: 20,000~1,000,000 and molecular weight distribution: 1.1~20, wherein the molar ratio of charged compounds is 100 mole of vinyl aromatic monomer/1~100 mole of conjugated diene monomer/0.01~1 mole of initiator; the amount of organic solvent is 50~500 (w/v) % of total reactant; and the polymerization temperature is 30~160° C.

9 Claims, 1 Drawing Sheet

PROCESS FOR PREPARING HIGH IMPACT VINYL AROMATIC POLYMER BY CONTINUOUS ANION POLYMERIZATION METHOD

BACKGROUND OF THE INVENTION

The present invention relates to a transparent high impact vinyl aromatic polymer and a process for preparing high impact vinyl aromatic polymer by continuous anion polymerization method.

Even though the general purpose polystyrene (GPPS) resin has many merits, such as, cheap price, high processibility, transparency and rigidity, the ductility and durability of resin are not sufficient. To overcome such defects, high impact polystyrene (HIPS) has been developed. Such HIPS has improved the brittleness of polystyrene resin, by dispersing the polybutadiene particles in the polystyrene. However, such high impact polystyrene has a defect of opacity, and it has been required to develop transparent high impact polystyrene.

Commercially manufactured transparent high impact polystyrene resin has been produced according to free radical polymerization of styrene in the presence of the dissolved rubber. According to the types of rubber, various kinds of transparent high impact polystyrene have been manufactured. Japanese laying-open patent No. 2000-61444 and No. 1985-181112 disclosed the high gloss and high impact polystyrene prepared after dissolving butadiene rubber to the styrene monomers. Further, lots of styrene-butadiene block copolymers have been disclosed in JP 88-48317, UK 1,490,625, JP 1993-88006, JP 1992-132112, U.S. Pat. No. 5,349,013 and U.S. Pat. No. 4,839,418, Even though various types of transparent high impact polystyrene have been manufactured using various types of rubber, all of them have been manufactured according to radical polymerization method.

On the other hand, there have been many researches regarding the development of transparent high impact polystyrene having high ductility and durability. As a part of research, polystyrene block copolymer has been suggested by anion polymerization method in the presence of organic metal compound initiator.

U.S. Pat. Nos. 4,584,346; 5,705,569 and 6,096,828 disclosed various block copolymers which are prepared by charging initiators and monomers in many times using anion polymerization methods. Even though obtained polymer have high impact and high mechanical polystyrene properties, they are hard to be manufactured because of their complicate batch process and low productivity.

On the other hand, Japanese laying-open patent No. 1981-28925 disclosed simple block copolymer represented by S-B/S, wherein S represents a vinyl aromatic block and B/S represents a tapered block by simultaneous or sequentially charging conjugated diene monomers and aromatic monomers. However, such method also showed the decline of productivity and physical property since this method is also a batch process.

Contrarily, U.S. Pat. No. 5,795,938 disclosed the high impact polystyrene which is manufactured by continuous anion polymerization method using different 2 tube reactors. In this disclosure, the polymerization method comprising i) polymerizing the polystyrene in one reactor; ii) polymerizing the styrene-butadiene block copolymer in the other reactor; and mixing the obtained polymers to introduce impact-resistance part was disclosed. However, such method might be regarded as only a simple mixing method of each different 2 polymers.

As described above, the known anion polymerization methods to prepare block copolymer using organic metal compound as an initiator have many defects, for example, the complexity of reaction steps to obtain multi-block and multi-component copolymer for obtaining the balance of various properties, the limitation of productivity caused by batch process, and the limitation of properties of obtained copolymer.

Therefore, there is a need for developing transparent high impact polymers, especially transparent high impact polystyrene resin, using continuous agitation reactor rather than conventional tube reactor. The present invention relates to a continuous anion polymerization method having better productivity rather than batch process to manufacture transparent high impact polymer in the forms of radial having more than 3 linear or branched chain or mixture of them.

To complete the present invention for manufacturing transparent high impact polymers, we have developed the continuous process by charging and the polymerizing the initiator, vinyl aromatic monomers and conjugated dienes continuously in the continuous agitation reactor. Further, the polymerization method of the present invention affords the many merits, such as, the control of polymerization heat, appropriate distribution of molecular weight offering the excellent physical properties of final product and high productivity. After polymerization, final transparent high impact polymers are prepared in the forms of linear, radial or mixture of them using multi-functional compounds or terminator.

Further, the advantageous effects of present invention can be exemplified as follows; i) control of molecular weight, distribution, branch density which can not be accomplished by free radical polymerization; ii) minimizing the accelerated reaction or gel formation which occurs in step reaction; iii) minimizing the amount of polymerization solvent; and iv) preparation of multi-component polymer mixed with linear and non-linear structure using multi-functional compounds.

In the other words, the present invention affords the multi-structural polymer contained with linear and non-linear structure, for example, chain, branch, radial or mixture of them by anion polymerization method at the agitation continuous reactor using vinyl aromatic monomers, conjugated diene monomers and multi-functional compounds. Further, the control of multi-functional compounds enables the control of reaction which has not been accomplished by conventional anion polymerization method. Of course, the present invention affords the polymer having excellent physical properties.

SUMMARY OF THE INVENTION

The object of present invention is to provide a continuous anion polymerization method for preparing transparent high impact vinyl aromatic polymer comprising the steps of: i ) charging and polymerizing vinyl aromatic monomers and initiator to obtain vinyl aromatic polymer in the presence of solvent and polar organic compounds in the first reactor (1a); ii) continuously charging and polymerizing vinyl aromatic monomers and conjugated diene monomers to the vinyl aromatic polymer obtained in the first reactor to obtain tapered vinyl aromatic polymer chain in the presence of organic solvent in the second reactor (1b); iii) continuously charging and polymerizing vinyl aromatic monomers and multi-functional compounds to the vinyl aromatic polymer chain obtained in the second reactor to obtain high impact vinyl aromatic polymer in the presence of organic solvent in the third reactor (1c); and iv) terminating the reaction with terminator and removing the remaining hydrocarbon solvent and unreacted monomers to obtain transparent high impact vinyl aromatic polymer having number average molecular weight: 20,000~1,000,000 and molecular weight distribution: 1.1~20, wherein the molar ratio of charged compounds is 100 mole of vinyl aromatic monomer/1~100 mole of conjugated diene monomer/0.01~1 mole of initiator; the amount of organic solvent is 50~500 (w/v) % of total reactant; and the polymerization temperature is 30~16 0° C.

Said vinyl aromatic monomer is at least one selected from the group consisting of styrene, α-methyl styrene, bromostyrene and mixture of them. Further, said conjugated diene monomer is at least one selected from the group consisting of 1,3-butadiene, 2-methyl-1,3-butadiene, 2-ethyl-1,3-butadiene, 2,3-dimethyl-1,3-butadiene, and mixture of them.

Said hydrocarbon solvent is at least one selected from the group consisting of cyclohexane, benzene, n-hexane, n-heptane, toluene, ethyl benzene, xylene, tetrahydrofuran, diethylether and mixture of them. Further, said polymerization initiator is at least one selected from the group consisting of n-butyl lithium, sec-butyl lithium, tert-butyl lithium, methyl lithium, ethyl lithium, phenyl lithium and mixture of them.

Said multi-functional compounds is at least one selected from the group consisting of halogen, functional vinyl aromatic, isocyanate, ester, anhydride, lactone, aldehyde, epoxide, ketone and mixture of them. In particular, divinylbenzene, 1,2,4-trivinylbenzene, 1,3-divinylnaphtalene, 1,3,5-trivinyl-naphtalene, 2,4-divinylbiphenyl-p-diisopropenenylbenzene and mixture of them can be used as vinyl aromatic compound. Other multi-functional compounds can be exemplified as epoxified carbohydrate, organo alkyl phosphite, arylalkyl phosphite, multi-functional isocyanate, multi-functional imine, multi-functional aldehyde, multi-functional halide, multi-functional metal halide. Further, methanol, ethanol, isopropanol, water or carbon dioxide can be used as a terminator.

DETAILED DESCRIPTION OF THE INVENTION

Figure 1:
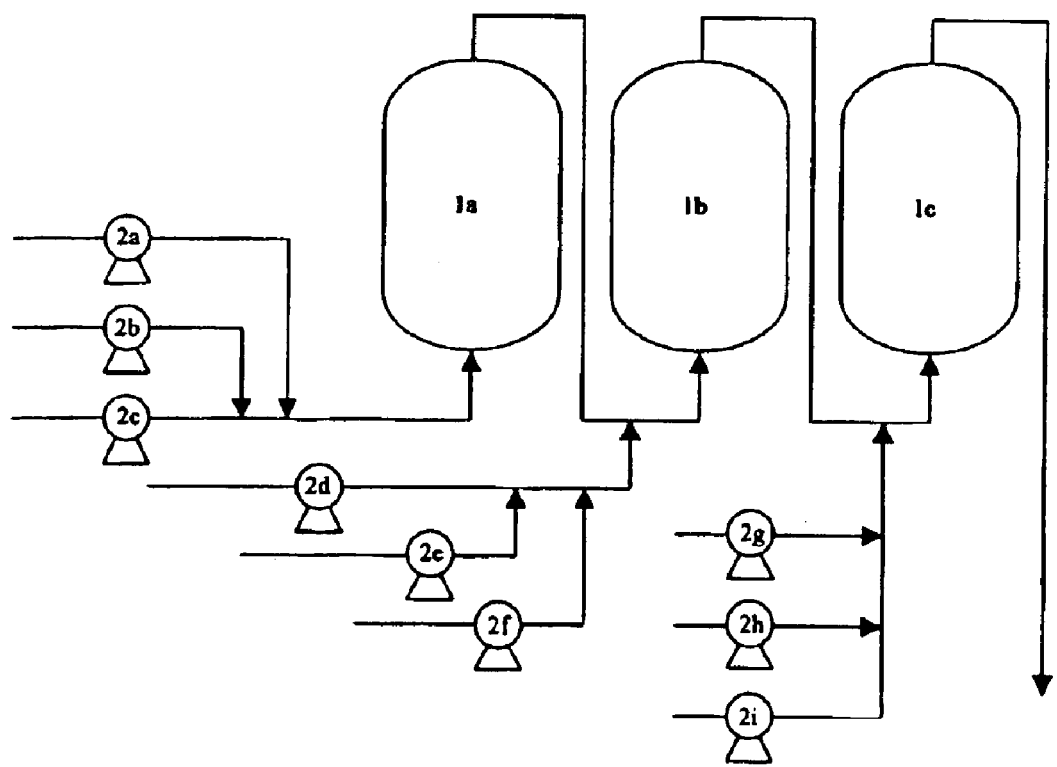
FIG. 1. shows the arrangement of 3 reactors and flow of compounds according to the present invention.

The present invention uses the 3 complete agitation reactors arranged in linear sequence for high viscosity anion polymerization method, wherein vinyl aromatic polymer is prepared in the first reactor, tapered conjugated diene vinyl aromatic polymer chain is prepared in the second reactor by charging vinyl aromatic compounds and conjugated diene monomers, high impact vinyl aromatic polymer is prepared in the third reactor by charging vinyl aromatic compounds and multi-functional compounds. The polymerization method is finished by the addition of terminator and remaining organic solvent and unreacted monomers are removed.

The molar ratio of vinyl aromatic monomer: conjugated diene monomer is 1:0.01~1, preferably, 1:0.05~0.5, The weight ratio of charged monomers: organic solvent is 1:0.5~5.0, preferably, 1: 0.5~3.0, In the first reactor, the polymerization is initiated by simultaneously charging vinyl aromatic monomers, initiator and polar organic compound for controlling the reaction rate in the presence of hydrocarbon solvent. The obtained polymer in the first reactor has number average molecular weight 5,000~500,000, preferably, 10,000~200,000, The continuous polymerization method of the present invention affords the control of polymerization reaction heat due to its low polymerization reaction rate and also affords the broad molecular weight distribution. The initiator is charged continuously in an amount of 0.01~1.0 mole as to 100 mole of charged monomers. The polymerization temperature is 30~160° C. and the molecular weight distribution of obtained polymer is 1.05~10, As an initiator, n-butyl lithium, sec-butyl lithium, tert-butyl lithium, methyl lithium, ethyl lithium, phenyl lithium or mixture of them can be used.

In the second reactor, additional vinyl aromatic monomers and conjugated diene monomers are charged to the polymer obtained in the first reactor. The amount of vinyl aromatic monomers is 5~100 mole as to 100 mole of charged monomers in the first reactor, and the amount of conjugated diene monomers is 5~100 mole as to 100 mole of charged monomers in the first reactor. In the second reactor, tapered conjugated diene vinyl aromatic copolymer is prepared by polymerization at 30~160° C. The number average molecular weight of the polymer obtained in the second reactor is 10,000~800,000, preferably, 20,000~400,000 with molecular weight distribution of 1.05~10.

In the third reactor, additional vinyl aromatic monomers are charged in an amount of 5~200 mole as to 100 mole of monomers charged in the first reactor to obtain the polystyrene block, and multi-functional compound is also charged. The amount of charged multi-functional compound is 0.01~50 mole as to 100 mole of monomers. The example of multi-functional compound is one or more selected from the group consisting of halogen, functional vinyl aromatic, isocyanate, ester, anhydride, lactone, aldehyde, epoxide, ketone and mixture of them. The number average molecular weight of obtained copolymer is 20,000~1,000,000, preferably, 50,000~500,000 and its distribution is 1.1~20, Finally, the polymerization reaction is finished by the addition of terminator, and organic solvent and unreacted monomers are removed.

The polymerization method of the present invention is carried out after removing air and moisture in the conventional anion polymerization method at 10~160° C., preferably, 30~150° C.

As an initiator of the present invention, C1~C6 aliphatic or aromatic compounds are used. For example, n-butyl lithium, sec-butyl lithium, tert-butyl lithium, methyl lithium, ethyl lithium, phenyl lithium or mixture of them is used. As a vinyl aromatic compound, all kinds of styrene substituted monomers are used. For example, styrene, α-methyl styrene, or bromo styrene is used.

As a conjugated diene monomer, C4~C6 conjugated diene monomer can be used. Particularly, 1,3-butadiene, 2-methyl-1,3-butadiene (isoprene), 2-ethyl-1,3-butadiene, 2,3-dimethyl-1,3-butadiene or mixture of them is used. Preferably, 1,3-butadiene or 2-methyl-1,3-butadiene is used.

As a multi-functional compound in the present invention, halogen, functional vinyl aromatic, isocyanate, ester, anhydride, lactone, aldehyde, epoxide, ketone or mixture of them can be used. In particular, divinylbenzene, 1,2,4-trivinylbenzene, 1,3-divinylnaphtalene, 1,3,5-trivinyl-naphtalene, 2,4-divinylbiphenyl-p-diisopropenenylbenzene or mixture of them can be used as vinyl aromatic compound of multi-functional compound. Among them, divinylbenzene is preferred. Further, epoxified carbohydrate, organo alkyl phosphite, arylalkyl phosphite, multi-functional isocyanate, multi-functional imine, multi-functional aldehyde, multi-functional halide, multi-functional metal halide can be used. As preferred multi-functional compound, epoxidized soybean oil, epoxidized linsed oil, epoxidized vegetable oil or mixture of them can be used. As the most preferred coupling agent, epoxidized soybean oil is used.

As a reaction solvent, polar or non-polar hydrocarbon can be used. For example, cyclohexane, benzene, n-hexane, n-heptane, toluene, ethyl benzene, xylene, tetrahydrofuran, diethylether or mixture of them can be used. As a reaction terminator, methanol, ethanol, isopropanol, water or carbon dioxide can be used. The amount of terminator used in the present invention is equal or slightly more amount than the initiator used.

The present invention can be explained more particularly with description of drawing.

As shown in FIG. 1, three agitation reactors are arranged sequently and vinyl aromatic monomers, initiator and solvent are continuously charged using the pumps 2a, 2b, 2c to the first reactor (1a). For controlling the reaction rate, polar organic compound is simultaneously charged with organic solvent. Using heat exchanger, the reaction temperature is maintained constantly at 30~160° C. After a lapse of time, the reactant is transferred to the second reactor (2a). Then, vinyl aromatic monomers and conjugated diene monomers are charged continuously using the pumps 2d, 2e, 2f. Also, the reaction temperature is maintained at 30~160° C. using heat exchanger. In the third reactor (1c), vinyl aromatic monomers, multi-functional compound and organic solvent are charged. Also, the reaction temperature is maintained at 30~160° C. using heat exchanger. The reaction is finished using the reaction terminator.

The present invention is described more concretely by following examples, but the scope of the present invention shall not be limited by following examples.

EXAMPLE I

In this example, the process for preparing high impact polystyrene mixed with linear and non-linear type according continuous anion polymerization method.

The polymerization is carried out in the 6L of three stainless steel jacket reactor under high purity nitrogen atmosphere. In the first reactor, 50 g/min of ethylbenzene, 50 g/min of styrene and 20 g/min of 0.05 mole of n-butyl lithium are charged. The reaction temperature is maintained at 70° C. using heat exchanger. In the second reactor, 25 g/min of ethylbenzene, log/min of styrene and 15 g/min of butadiene are charged. The reaction temperature is maintained at 70° C. using heat exchanger. In the third reactor, 35 g/min of ethylbenzene, 35 g/min of styrene and 1 g/min of 0.05 mole of divinylbenzene as a multi-functional compound are charged. The obtained polystyrene copolymer has 150,000 of number average molecular weight and 3.2 of molecular weight distribution.

The reaction is finished using carbon dioxide as a terminator. The melt index of the obtained polymer is 5.5 g/10 min (measured by ASTM D-1238).

EXAMPLE II

In this example, the process for preparing high impact polystyrene mixed with each different conjugated diene monomers according continuous anion polymerization method.

The polymerization is carried out in the 6L of three stainless steel jacket reactor under high purity nitrogen atmosphere. In the first reactor, 50 g/min of toluene, 50 g/min of styrene and 20 g/min of 0.05 mole of n-butyl lithium are charged. The reaction temperature is maintained at 70° C. using heat exchanger. In the second reactor, 10 g/min of styrene, 15 g/min of the mixture of butadiene and isoprene (1:1) and 25 g/min of toluene are charged. The reaction temperature is maintained at 70° C. using heat exchanger. In the third reactor, 35 g/min of toluene, 35 g/min of styrene and 2 g/min of 0.05 mole of epoxidized soybean oil as a multi-functional compound are charged. The obtained polystyrene copolymer has 140,000 of number average molecular weight and 3.0 of molecular weight distribution.

The reaction is finished using carbon dioxide and water as a terminator. The melt index of the obtained polymer is 6.2 g/10 min (measured by ASTM D-1238).

EXAMPLE III

In this example, the process for preparing high impact polystyrene mixed with linear and radial type according continuous anion polymerization method.

The polymerization is carried out in the 6L of three stainless steel jacket reactor under high purity nitrogen atmosphere. In the first reactor, 60 g/min of toluene, 40 g/min of styrene and 25 g/min of 0.05 mole of n-butyl lithium are charged. The reaction temperature is maintained at 70° C. using heat exchanger. In the second reactor, 40 g/min of toluene, 10 g/min of styrene and 30 g/min of butadiene are charged. The reaction temperature is maintained at 70° C. using heat exchanger. In the third reactor, 20 g/min of toluene, 20 g/min of styrene and 3 ml/min of 0.05 mole of epoxidized soybean oil as a multi-functional compound are charged. The obtained polystyrene copolymer has 130,000 of number average molecular weight and 3.1 of molecular weight distribution.

The reaction is finished using carbon dioxide as a terminator. The melt index of the obtained polymer is 8.1 g/10 min (measured by ASTM D-1238).

COMPARATIVE EXAMPLE I

This comparative example explains the process for preparing polystyrene according to continuous anion polymerization method.

The polymerization is carried out in the 6L of three stainless steel jacket reactor under high purity nitrogen atmosphere. In the first reactor, 100 g/min of toluene, 100 g/min of styrene and 15 g/min of 0.05 mole of n-butyl lithium are charged. The reaction temperature is maintained at 70° C. using heat exchanger. In the second reactor, there is no charge of monomers. In the third reactor, only 5 g/min of 0.05 mole of epoxidized soybean oil as a multi-functional compound are charged. The obtained polystyrene copolymer has 145,000 of number average molecular weight and 2.6 of molecular weight distribution.

The reaction is finished using carbon dioxide as a terminator. The melt index of the obtained polymer is 7.5 g/10 min (measured by ASTM D-1238).

EXAMPLE IV

The physical properties of obtained polymers in Example I~III and Comparative Example I together with commercially marketed product A and B are measured after preparing test material according to ASTM method.

TABLE I

| Sample | melt index G/10 min | tensile strength kgf/cm² | elongation % | flextual strength kgf/cm² | flextual modulus kgf/cm² | transition temp. °C. | izod impact strength Kj/m² |
|---|---|---|---|---|---|---|---|
| Example 1 | 5.5 | 420 | 110 | 430 | 23460 | 68.8 | 2.4 |
| Example 2 | 6.2 | 380 | 115 | 426 | 21650 | 69.2 | 2.6 |
| Example 3 | 8.1 | 410 | 150 | 410 | 18570 | 65.7 | 2.8 |
| Com. Ex. 1 | 7.5 | 450 | 1.1 | 450 | 31186 | 80.6 | 1.2 |
| A | 6.5 | 264 | 124 | 340 | 16370 | 57.5 | 2.5 |
| B | 6.3 | 294 | 86 | 386 | 16367 | 60.3 | 2.6 |

As shown Table I, the izod impact strength of polymer of the present invention has improved more than twice compared to conventional polymer. Other properties of the polymer are also improved.

What is claimed is:

1. A continuous anion polymerization method for preparing transparent high impact vinyl aromatic polymer comprising the steps of:
   i) charging and polymerizing vinyl aromatic monomers and initiator to obtain vinyl aromatic polymer in the presence of solvent and polar organic compounds in a first reactor;
   ii) continuously charging and polymerizing vinyl aromatic monomers and conjugated diene monomers to the vinyl aromatic polymer obtained in the first reactor to obtain tapered vinyl aromatic polymer chain in the presence of organic solvent in a second reactor;
   iii) continuously charging and polymerizing vinyl aromatic monomers and multi-functional compounds to the vinyl aromatic polymer chain obtained in the second reactor to obtain high impact vinyl aromatic polymer in the presence of organic solvent in a third reactor; and
   iv) terminating the reaction with terminator and removing the remaining hydrocarbon solvent and unreacted monomers to obtain transparent high impact vinyl aromatic polymer having number average molecular weight: 20,000 to 1,000,000 and molecular weight distribution: 1.1 to 20,
   wherein the molar ratio of charged compounds is 100 mole of vinyl aromatic monomer/1 to 100 mole of conjugated diene monomer/0.01 to 1 mole of initiator; the amount of organic solvent is 50 to 500 (w/v) % of total reactant; and the polymerization temperature is 30 to 160° C.

2. The continuous anion polymerization method for preparing transparent high impact vinyl aromatic polymer according to claim 1, wherein said vinyl aromatic monomer is at least one selected from the group consisting of styrene, α-methyl styrene, bromo-styrene and mixture of them.

3. The continuous anion polymerization method for preparing transparent high impact vinyl aromatic polymer according to claim 1, wherein said conjugated diene monomer is at least one selected from the group consisting of 1,3-butadiene, 2-methyl-1,3-butadiene, 2-ethyl-1,3-butadiene, 2,3-dimethyl-1,3-butadiene, and mixture of them.

4. The continuous anion polymerization method for preparing transparent high impact vinyl aromatic polymer according to claim 1, wherein said hydrocarbon solvent is at least one selected from the group consisting of cyclohexane, benzene, n-hexane, n-heptane, toluene, ethyl benzene, xylene, tetrahydrofuran, diethylether and mixture of them.

5. The continuous anion polymerization method for preparing transparent high impact vinyl aromatic polymer according to claim 1, wherein said polymerization initiator is at least one selected from the group consisting of n-butyl lithium, sec-butyl lithium, tert-butyl lithium, methyl lithium, ethyl lithium, phenyl lithium and mixture of them.

6. The continuous anion polymerization method for preparing transparent high impact vinyl aromatic polymer according to claim 1, wherein said multi-functional compounds is at least one selected from the group consisting of halogen, functional vinyl aromatic, isocyanate, ester, anhydride, lactone, aldehyde, epoxide, ketone and mixture of them.

7. The continuous anion polymerization method for preparing transparent high impact vinyl aromatic polymer according to claim 6, wherein said vinyl aromatic compound is one or more selected from the group consisting of divinylbenzene, 1,2,4-trivinylbenzene, 1,3-divinylnaphtalene, 1,3,5-trivinyl-naphtalene, 2,4-divinylbiphenyl-p-diisopropenenylbenzene and mixture of them.

8. The continuous anion polymerization method for preparing transparent high impact vinyl aromatic polymer according to claim 6, wherein said multi-functional compounds is at least one selected from the group consisting of epoxified carbohydrate, organo alkyl phosphite, arylalkyl phosphite, multi-functional isocyanate, multi-functional imine, milti-functional aldehyde, multi-functional halide and multi-functional metal halide.

9. The continuous anion polymerization method for preparing transparent high impact vinyl aromatic polymer according to claim 1, wherein said terminator is at least one selected from the group consisting of methanol, ethanol, isopropanol, water and carbon dioxide.

* * * * *